United States Patent
Eng et al.

(10) Patent No.: US 9,139,133 B2
(45) Date of Patent: Sep. 22, 2015

(54) VEHICLE COLLISION WARNING SYSTEM AND METHOD

(75) Inventors: Donald Eng, Markham (CA); Norman J. Weigert, Whitby (CA); Jarvis Chau, Toronto (CA)

(73) Assignee: GM Global Technology Operations LLC, Detroit, MI (US)

( * ) Notice: Subject to any disclaimer, the term of this patent is extended or adjusted under 35 U.S.C. 154(b) by 478 days.

(21) Appl. No.: 13/485,291

(22) Filed: May 31, 2012

(65) Prior Publication Data

US 2013/0321628 A1    Dec. 5, 2013

(51) Int. Cl.
| H04N 7/18 | (2006.01) |
| G02B 5/08 | (2006.01) |
| G09G 5/00 | (2006.01) |
| G01C 23/00 | (2006.01) |
| B60Q 1/00 | (2006.01) |
| B60R 1/00 | (2006.01) |

(52) U.S. Cl.
CPC .............. *B60R 1/00* (2013.01); *B60R 2300/307* (2013.01); *B60R 2300/8093* (2013.01)

(58) Field of Classification Search
CPC .......... H04N 13/0239; H04N 13/0298; H04N 13/0246; H04N 13/0055
USPC .................... 348/148, E07.085; 701/36, 301; 382/103, 107; 340/436
See application file for complete search history.

(56) References Cited

U.S. PATENT DOCUMENTS

| 6,768,944 | B2 * | 7/2004 | Breed et al. .................... 701/301 |
| 7,711,147 | B2 * | 5/2010 | Koike et al. ................... 382/103 |
| 8,138,903 | B2 * | 3/2012 | Lindahl et al. ................ 340/438 |
| 8,461,976 | B2 | 6/2013 | Yamamoto |
| 2008/0001971 | A1 * | 1/2008 | Kouninski ..................... 345/635 |
| 2010/0188720 | A1 * | 7/2010 | Nakamura et al. ............... 359/13 |
| 2011/0128138 | A1 * | 6/2011 | Yamamoto et al. ........... 340/436 |
| 2011/0254700 | A1 | 10/2011 | Gharsalli |

FOREIGN PATENT DOCUMENTS

CN    102081861 A    6/2011

OTHER PUBLICATIONS

Chinese Office Action for Application No. 201310212044.6, dated Apr. 3, 2015.

\* cited by examiner

*Primary Examiner* — Sath V Perungavoor
*Assistant Examiner* — Patricia I Young
(74) *Attorney, Agent, or Firm* — Lionel D. Anderson; Reising Ethington P.C.

(57) ABSTRACT

A vehicle collision warning system and method that alerts a driver of an impending collision by displaying enhanced video of an upcoming road segment, where the enhanced video includes an in-path object that is highlighted so that it stands apart. In one exemplary embodiment, the system and method receive video of an upcoming road segment from a forward-looking vision system, obtain certain collision data for an in-path object, and then use the video and the collision data to provide enhanced video to a visual display that is seen by the driver. The enhanced video may include an in-path object that is highlighted according to the collision data (e.g., highlighted with a color-coded scheme where the in-path object changes color based on time-to-collision data) so that it stands apart from the rest of the upcoming road segment.

17 Claims, 3 Drawing Sheets

VEHICLE COLLISION WARNING SYSTEM AND METHOD

FIELD

The present invention generally relates to vehicle safety systems and, more particularly, to vehicle collision warning systems that use a visual display to warn or alert a driver of an impending collision.

BACKGROUND

Vehicles are increasingly using a variety of safety systems in order to avoid collisions and to improve their overall safety. For example, when a potential collision is detected, some vehicle safety systems generate audible, visual, or haptic warnings in order to alert the driver of the impending collision. While such warnings may be beneficial, there is always a need to improve or enhance the usefulness of such warnings by making them more intuitive to the driver, by conveying additional information, or by expanding the operating conditions in which they can be used, to cite a few examples.

SUMMARY

According to one embodiment, there is provided a collision warning system for a vehicle that comprises a vision system, a control module, and a visual display. The vision system provides video of an upcoming road segment that includes at least one in-path object. The control module receives the video from the vision system and provides enhanced video of the upcoming road segment that includes the in-path object, where the in-path object is highlighted according to collision data so that it stands apart from the rest of the upcoming road segment. The visual display then receives the enhanced video from the control module and displays the enhanced video to a driver.

According to another embodiment, there is provided a method of operating a collision warning system for a vehicle. The method may comprise the steps of: (a) receiving video that is of an upcoming road segment and includes an in-path object; (b) receiving collision data that pertains to the in-path object; (c) using the video and the collision data to generate enhanced video that is of the upcoming road segment and includes the in-path object which is highlighted according to the collision data; and (d) providing the enhanced video to a visual display.

DRAWINGS

Preferred exemplary embodiments will hereinafter be described in conjunction with the appended drawings, wherein like designations denote like elements, and wherein.

DESCRIPTION

The collision warning system and method described herein can alert a driver of an impending collision by displaying enhanced video of an upcoming road segment, where the enhanced video includes one or more in-path objects that are highlighted so that they stand apart from the rest of the upcoming road segment. The system and method receive video of an upcoming road segment from a forward-looking vision system, they obtain certain collision data for an in-path object that is located in the upcoming road segment, and then they use the video and the collision data to provide enhanced video of the upcoming road segment to a visual display that is seen by the driver. In the enhanced video, the in-path object is highlighted according to the collision data (e.g., highlighted with a color-coded scheme where the in-path object changes color based on time-to-collision data) so that it stands apart from the rest of the road segment. It is possible for the enhanced video to be displayed to a driver via a heads-up-display (HUD), an instrument panel, a center console, or any other suitable visual display that can be used in daytime and nighttime driving conditions.

Figure 1:
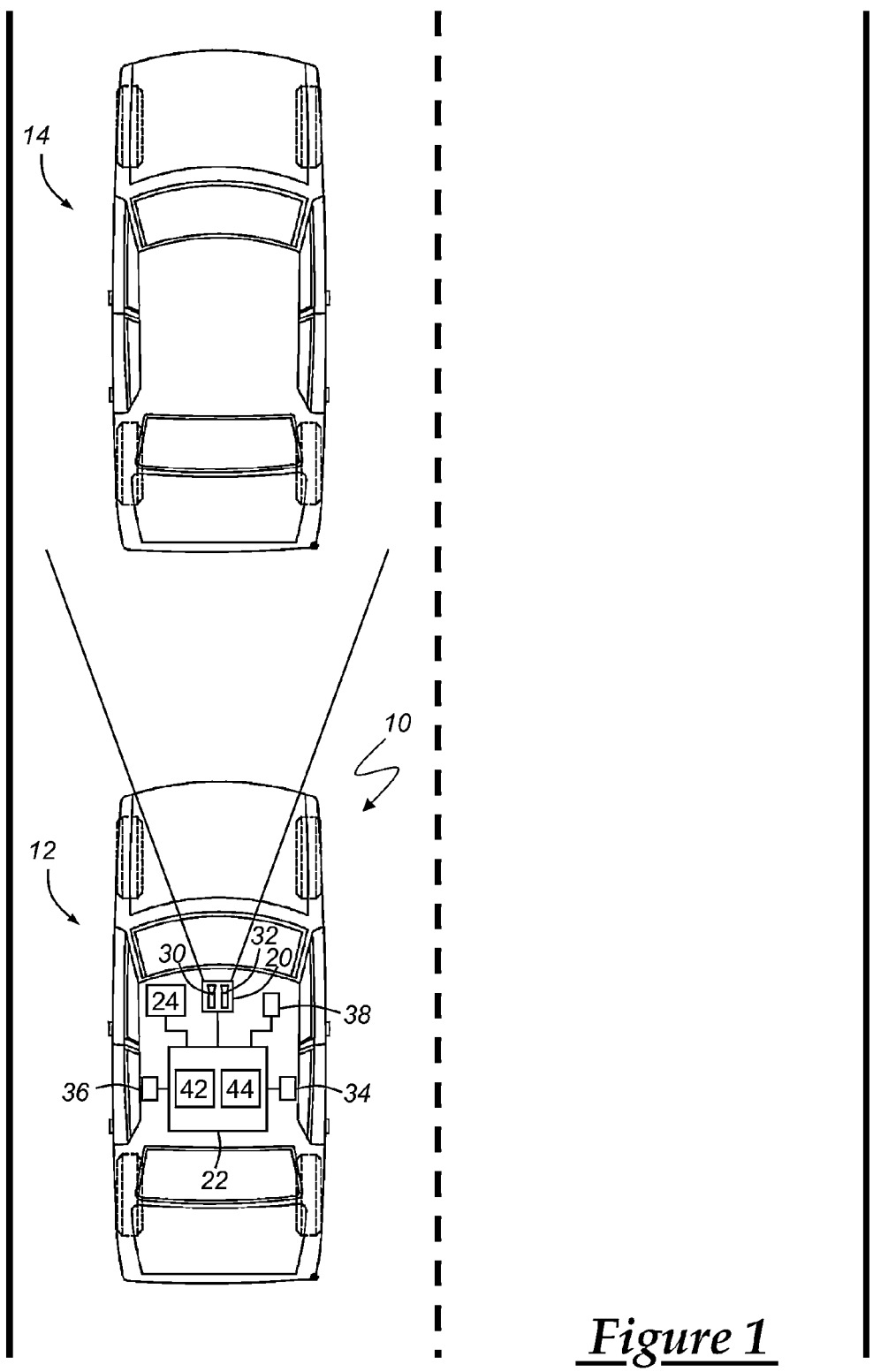
FIG. 1 is a schematic view of a host vehicle having an exemplary collision warning system.

With reference to FIG. 1, there are shown portions of an exemplary host vehicle 10 having a collision warning system 12 that may be used to warn or alert a driver of an impending collision with an in-path object 14. It should be appreciated that FIG. 1 is only a schematic representation of one potential vehicle and collision warning system, and that the method described herein could be used with any number of different vehicles and systems and is not limited to the exemplary ones shown here. For example, the present system and method may be used with any type of vehicle, including motorcycles, passenger cars, sports utility vehicles (SUVs), cross-over vehicles, trucks, vans, buses, recreational vehicles (RVs), commercial vehicles, tractor trailers, etc. These are merely some of the possible applications, as the system and method described herein are not limited to the exemplary embodiments shown and could be implemented in any number of different ways. According to one example, collision warning system 12 includes a vision system 20, a control module 22, and a visual display 24.

Vision system 20 provides collision warning system 12 with video of an upcoming road segment, and may do so in a number of different ways. In one embodiment, vision system 20 is a forward-looking stereo vision system that includes two or more video cameras 30, 32 (e.g., several megapixel digital CMOS video cameras) that are directed in front of host vehicle 10 and provide the system with streaming real-time video of the upcoming road segment. Notwithstanding the fact that the vision system may have one or more additional video or still cameras located around the vehicle that provide additional perspectives or video output to collision warning system 12, vision system 20 is preferably a forward-looking stereo vision system that captures images of an upcoming road segment located approximately 1 m-25 m in front of host vehicle 10. The use of multiple video cameras 30, 32 (i.e., a stereo vision system) allows vision system 20 to gather several different perspectives of the same image so that they can be stitched, blended and/or otherwise combined in much the same manner as used by human eyes. This typically provides a fuller, richer and more complete picture of the upcoming road segment, but it is not necessary as a single video camera may be used as well.

Some suitable mounting locations for vision system 20 include a rear-view mirror assembly located near a top-center portion of the front windshield, on top of the dash board near a bottom-center portion of the front windshield, or behind the front grill of the vehicle, to name a few possibilities. Vision system 20 may include multiple video cameras, other types of object-detecting sensors, and a processing unit all integrated into a single package; in a different embodiment, the multiple video cameras, the object-detecting sensors, and the processing unit are spaced apart and are mounted at different locations on the vehicle. The video cameras of vision system 20 may be part of some other component, device, module and/or system in the vehicle, like a vehicle safety system or collision avoidance system; in such a case, the same cameras can be used or shared by collision warning system 12. Although vision system 20 has been described in the context of a video camera-based system, it is possible for the system to use other image-gathering devices instead of video cameras.

In addition to video cameras, collision warning system 12 may include other object-detecting sensors 34, 36, 38 that are located around the vehicle and provide the system with certain collision data regarding in-path or out-of-path objects. For example, one or more infrared (IR) sensors 38 can be directed at the upcoming road segment and provide collision warning system 12 with additional information, such as expected time-to-collision data for various objects of interest, in order to supplement the video provided by vision system 20. "Time-to-collision data," as used herein, generally refers to the estimated time or distance that it will take for the host vehicle to collide with an object according to their current or anticipated paths. Depending on the particular needs of the application, object-detecting sensors like still cameras, RADAR sensors, LASER sensors and/or LIDAR sensors may be used in addition to or in lieu of the IR sensors mentioned above. These object-detecting sensors, along with additional video cameras, may be mounted around the vehicle and directed to the front, side or rear of the vehicle, depending on the particular needs of the system. It is possible for object-detecting sensors 34, 36, 38 to be part of vision system 20 or some other component, device, module and/or system in the vehicle, as mentioned above.

Control module 22 receives video of the upcoming road segment from vision system 20, obtains certain collision data regarding an in-path object (e.g., time-to-collision data), and uses the video and the collision data to provide visual display 24 with enhanced video. "Enhanced video," as used here, broadly includes any video with one or more in-path objects that have been visually altered or modified based on some type of collision data. A non-limiting example of enhanced video is the video output from control module 22, where the output is a real-time or streaming black and white digital video output of the upcoming road segment and one or more in-path objects 14 have been highlighted in color or by some other means based on time-to-collision data for that object.

Control module 22 may include any variety of electronic processing devices, memory devices, input/output (I/O) devices, and/or other known components, and may perform various control and/or communication related functions. In an exemplary embodiment, control module 22 includes an electronic memory device 42 that stores: video, still images and/or other collision data from vision system 20 and sensors 34, 36, 38; look-up tables or other data structures; algorithms, such as the one embodied in the exemplary method described below, etc. Memory device 42 may also store pertinent characteristics and background information pertaining to host vehicle 10, such as acceleration- and braking-related parameters and settings, etc. Control module 22 may also include an electronic processing device 44 (e.g., a microprocessor, a microcontroller, an application specific integrated circuit (ASIC), etc.) that executes instructions for software, firmware, programs, algorithms, scripts, etc. that are stored in memory device 42 and may govern the processes and methods described herein. Control module 22 may be electronically connected to other vehicle devices, modules and systems via suitable vehicle communications and can interact with them when required. These are, of course, only some of the possible arrangements, functions and capabilities of control module 22, as other embodiments could also be used.

Depending on the particular embodiment, control module 22 may be a stand-alone vehicle electronic module (e.g., a collision warning control module, a visual display control module, etc.), it may be incorporated or included within another vehicle electronic module (e.g., an adaptive cruise control module, an automated lane change control module, etc.), or it may be part of a larger vehicle network or system (e.g., a collision avoidance system, an active safety system, an antilock brake system (ABS), etc.), to name a few possibilities. According to one potential embodiment, control module 22 is a visual display control module and is coupled to both vision system 20 and visual display 24, where the vision system provides both video and collision data to the control module. In another embodiment, control module 22 is a vision system controller and is integrated within vision system 20 along with video cameras, object-detecting sensors and other suitable components. It is also possible for control module 22 to be coupled to other vehicle systems, such as a collision avoidance system or an active safety system, so that the control module can provide such systems with collision data and other potentially useful information that enables them to take automatic actions to avoid, mitigate or otherwise prepare for potential collisions. It should be appreciated that control module 22 is not limited to any one particular embodiment or arrangement and can differ from that illustrated and described here.

Visual display 24 receives enhanced video from control module 22 and then conveys the enhanced video to a driver so that they can be warned of in-path objects in the upcoming road segment. Visual display 24 provides information to the driver and may include any combination of visual, audio and/or other types of components for doing so. Visual display 24 may be a stand-alone unit or it may be integrated into some other component, device, module or system in the vehicle (e.g., a rear-view mirror assembly); it may be part of or share a display with a vehicle infotainment or safety system (e.g., utilize the same screen that plays movies, provides navigational services, or displays the output of a back-up camera); or it may be part of an instrument cluster, center console, or driver information center (DIC), to cite a few examples. In the exemplary embodiment shown in FIG. 1, visual display 24 is a color heads-up display (HUD) that projects the enhanced video onto an out-of-the-way portion of the windshield (e.g., the lower driver-side corner of the front windshield) and alerts the driver of a potential collision by highlighting in-path objects 14 and other potential obstacles. Of course, other visual displays may be used instead.

Again, FIG. 1 and the preceding written description of exemplary host vehicle 10 and collision warning system 12 are only intended to illustrate one potential embodiment, as the following method is not confined to use with only that system. Any number of other system arrangements, combinations, and architectures, including those that differ significantly from the one shown in FIG. 1, may be used instead.

Figure 2:
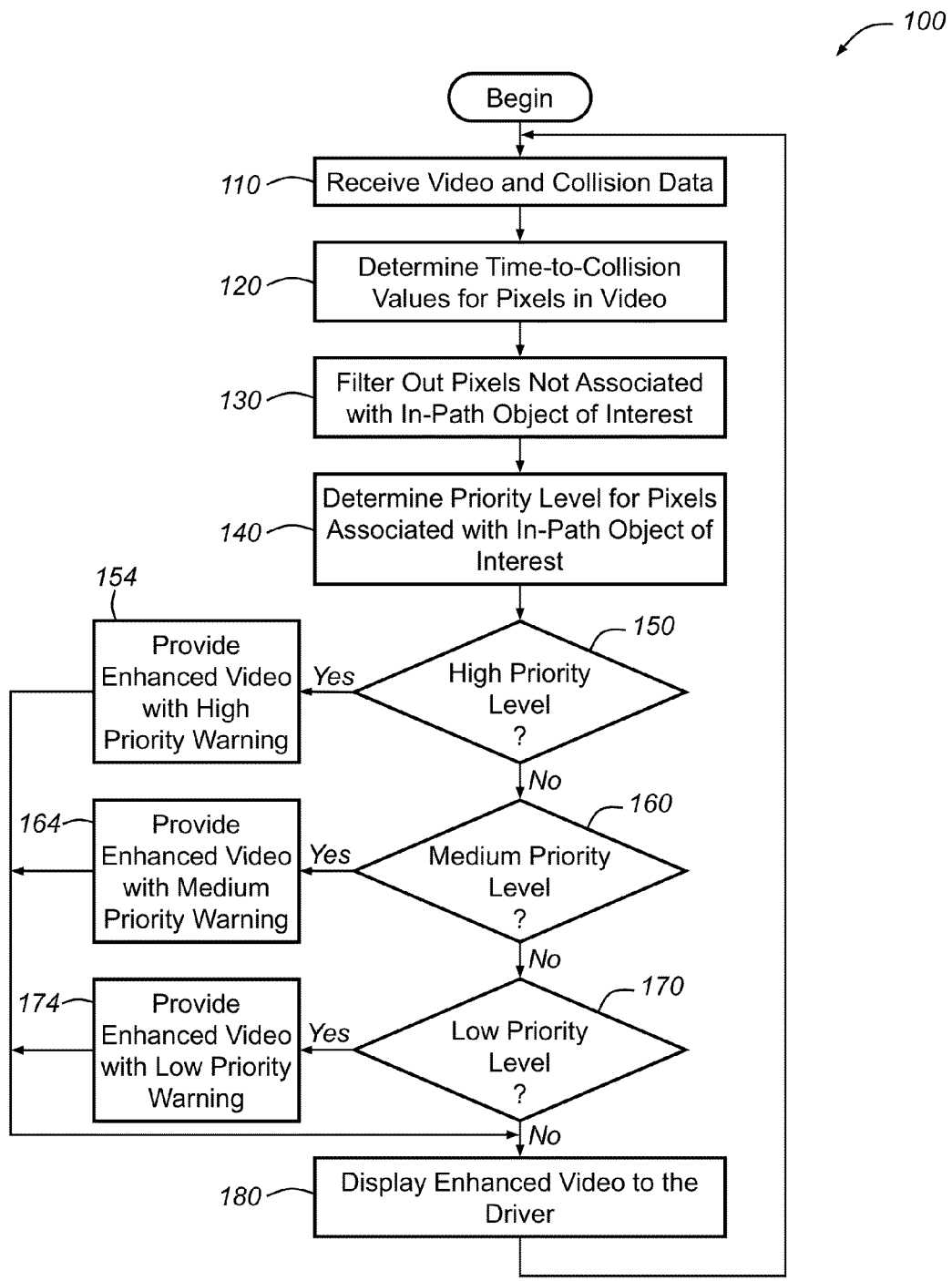
FIG. 2 is a flowchart of an exemplary method that may be used with a vehicle collision warning system, such as the one shown in FIG. 1.

Turning now to FIG. 2, there is shown an exemplary method 100 for operating a collision warning system for a vehicle, such as the one shown in FIG. 1. Beginning with step 110, the method receives video of the upcoming road segment and collision data for at least one in-path object. According to an exemplary embodiment where vision system 20 has its own collision data-producing capabilities, step 110 receives both video and collision data from vision system 20. In a different embodiment, step 110 receives video from vision system 20 and collision data from separate object-detecting sensors, such as forward-looking IR or RADAR sensor 38. The video from vision system 20 may be continuously provided on a real-time basis so that it streams from vision system 20 to control module 22 whenever collision warning system 12 is in operation, or the video may be intermittently provided on an event basis so that memory, processing and/or other resources are conserved. In several examples of an event-basis version, vision system 20 only provides video to control module 22 when the vehicle is traveling at or above a certain threshold (i.e., vehicle speed surpassing the threshold is the event) or when an in-path object 14 has been detected in the upcoming road segment (i.e., the detection of the in-path object is the event). Other events or conditions may be used as well. It should be appreciated that in-path object 14 may include a moving object such as another vehicle, a bicyclist or a pedestrian, or it may include a stationary object like debris in the road, a fallen tree limb, or a disabled vehicle. Depending on the field-of-view of vision system 20 and/or object-detecting sensors 34, 36, 38, it is possible that one or more objects like trees and utility poles could be captured in the video, even though they are not technically in the path of host vehicle 10; such objects will be treated below in more detail.

As mentioned above, step 110 may also receive collision data that pertains to one or more in-path objects 14 in the upcoming road segment. "Collision data," as used herein, broadly includes any type of information or other data that pertains to an in-path object in the upcoming road segment or an out-of-path object that is off to the side of the road. Some non-limiting examples of possible collision data include: time-to-collision data for a moving or stationary object (e.g., range data used to estimate the amount of time until a collision), an estimated velocity or acceleration for a moving in-path object (e.g., the absolute velocity of an in-path vehicle or the relative velocity between an in-path vehicle and the host vehicle), and an estimated size of an in-path object so that the method can distinguish between an abandoned vehicle or a small piece of trash in the lane of the host vehicle. It should be appreciated that time-to-collision data (also referred to as range data) can be expressed in terms of time (e.g., 3 seconds until impact), distance (e.g., 50 feet until impact), or some other suitable metric and, in some cases, it is already being gathered and used by devices around the vehicle, like vision system 20.

The following description assumes that an in-path object has already been detected in the upcoming road segment and that vision system 20 provides both video and collision data; as explained above, this is not necessary as the collision data could come from other sources. In this particular example, vision system 20 overlays the collision data onto the video to generate a range map video where each pixel of the range map video is color coded according to its time-to-collision value. Those pixels that correspond to objects farther away may be colored green, for example, while those pixels that correspond to closer objects may be colored orange, red, or some other color denoting their respective urgency. In this manner, the video and collision data have been combined or interweaved with one another by vision system 20 and provided together. One potential challenge with simply displaying this range map video to the driver is that the sheer amount of information being conveyed could be distracting, confusing, or just not helpful, as every pixel in the range map video is colored and can make for quite a collage of images. It should be appreciated that the video and collision data may be provided in any number of different ways, formats, etc., including but not limited to the examples provided herein. The following steps are described in conjunction with FIGS. 3A and 3B, which are simple illustrations of two different enhanced video frames from control module 22 taken at two different points in time. In the frame of FIG. 3A, an in-path object 14 (in this case a vehicle) is further away; in the frame of FIG. 3B, the in-path object is closer.

In step 120, the method evaluates the video and collision data obtained in the previous step so that a time-to-collision value can be determined for each pixel or group of pixels in the video. According to the example above where vision system 20 provides video and collision data combined in a range map video, step 120 deciphers the color-coded range map video where each pixel has been assigned a color based on its estimated time-to-collision value. At the completion of this exemplary step, the method should have an expected time-to-collision value for each pixel or group of pixels in the video. In FIG. 3A, for example, step 120 determines time-to-collision values for the entire video of the upcoming road segment, including: the pixels or groups of pixels 100 which correspond to the road surface right in front of host vehicle 10, the pixels or groups of pixels 102 which correspond to an out-of-path tree 110, and the pixels or groups of pixels 104 which correspond to an in-path object or vehicle 14. Time-to-collision data is also being gathered for the other pixels in the video frame, however, pixels associated with 100, 102, 104 have been singled out in an effort to illustrate certain features or techniques that can be used by step 130. This collection of time-to-collision values may be maintained in any appropriate data form and structure (e.g., each pixel or group of pixels could have a vector associated with it), and can be stored in electronic memory device 42. Of course, other techniques for gathering, extracting, evaluating and/or storing time-to-collision or other collision data may be used instead.

Next, step 130 filters out or disregards the pixels or groups of pixels not associated with an in-path object of interest. A variety of criteria may be used when performing this step. For example, pixels 100 are associated with the road surface which is in-path and is quite close to host vehicle 10, but is not an object of interest because the road surface is not the type of object that typically results in a potential collision; thus, pixels 100 can be disregarded. Pixels 102 are associated with a tree 110 that is somewhat close to host vehicle 10 and is clearly the type of object that is of interest, but the tree is not in-path; therefore, pixels 102 can be disregarded. Pixels 104, on the other hand, are associated with vehicle 14, which is in-path, is rather close to host vehicle 10, and is the type of object that is of interest; accordingly, pixels 104 are not disregarded but are identified for further processing. By filtering out or disregarding pixels that are associated with objects that are very far away, that are out-of-path, or that are not the types of objects of significant interest or concern, the method is able to focus in on those objects that are most likely to present a potential collision without confusing or distracting the driver with superfluous information. Various algorithms, techniques, and criteria may be used for determining which pixels to filter out or disregard and which to identify for further processing. Some other criteria or input that may be used include steering angles, yaw rates, vehicle speeds, object speeds, etc.

Step 140 then determines a priority level for the pixels or groups of pixels that are associated with an in-path object of interest. That is, for the pixels that were not filtered out or disregarded in the previous step. The actual techniques and methods used to carry out this step may vary. For example, step 140 may evaluate the non-filtered pixels or groups of pixels and assign them a priority level that is based on their corresponding time-to-collision value. All pixels with a time-to-collision value of 0-3 seconds may be assigned a high priority level (e.g., one where the pixels are highlighted in 'red' or some other color denoting urgency), all pixels with a time-to-collision value of 3-6 seconds may be issued a medium priority level (e.g., one where the pixels are highlighted in 'orange'), all pixels with a time-to-collision value of 6-9 seconds may be given a low priority level (e.g., one where the pixels are highlighted in 'green'), and all other pixels such as those with a time-to-collision value greater than 9 seconds or with no such value at all could receive a low-level default priority level. Collision data other than time-to-collision values (e.g., steering angle, yaw rate, host vehicle velocity or acceleration, in-path object velocity or acceleration, etc.) may be used when performing step 140. The preceding values, ranges, priority levels, colors and criteria are simply provided to illustrate this step, as others could certainly be used. For instance, step 140 may utilize more or less than three priority levels, different colors, or other techniques for highlighting the object of interest other than color. The order in which the pixels or groups of pixels are evaluated and assigned priority may be based on their location in the video image or some other criteria, and the techniques used for assigning priority or grading the pixels may differ from the non-limiting example above.

Next, steps 150-174 provide enhanced video of the upcoming road segment, where one or more in-path objects are highlighted according to their respective priority level. By highlighting or otherwise drawing attention to in-path objects of interest, the present method is able to provide an enhanced video where such objects stand apart from the rest of the upcoming road segment and therefore act as a more intuitive warning to the driver. Consider the example illustrated in FIG. 3A where in-path vehicle 14 is the only in-path object of interest in the upcoming road segment and its corresponding pixels have been assigned a low priority because the vehicle is still relatively far away. In this case, the method will proceed to steps 170, 174 and will generate and provide enhanced video where vehicle 14 is highlighted according to some low priority highlighting or coloring scheme. According to one example, step 174 highlights all or some of the pixels associated with vehicle 14 by assigning them a color, such as green, that suggests a non-imminent or low priority situation. The colored pixels may only include those associated with the outline or perimeter of the object (i.e., a sort-of "halo" effect), they could include all of the interior pixels as well, or they could include some of the nearby pixels that surround the object, to cite a few possibilities. In another example, step 174 highlights all or some of the pixels associated with vehicle 14 by causing them to be brighter, to flash, or to otherwise stand apart from the rest of the upcoming road segment. In the example where the method employs a coloring scheme to highlight the in-path object of interest, the rest of the video image could be provided in black and white to provide more contrast for the highlighted object.

Figure 3B:
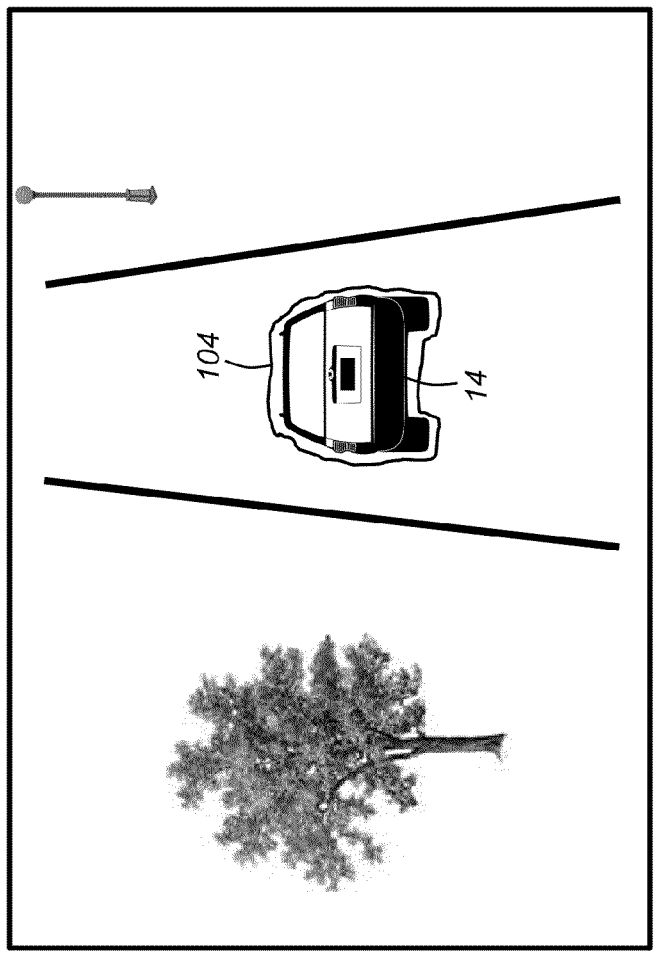
FIGS. 3A and 3B are illustrations of enhanced video frames of an upcoming road segment at different points in time, where an in-path object (in this case another vehicle) is highlighted so that it stands apart from the rest of the upcoming road segment.
Figure 3A:
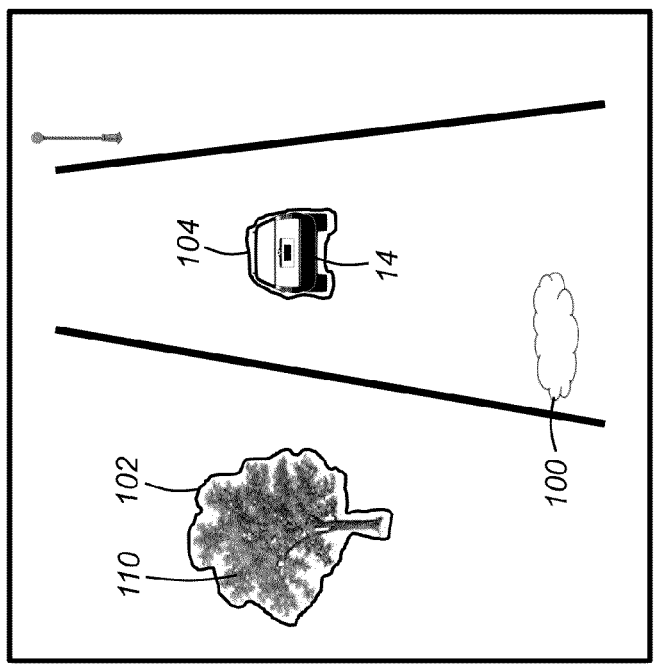

In the example illustrated in FIG. 3B, vehicle 14 is now closer to host vehicle 10, therefore, its corresponding pixels or groups of pixels 104 have been assigned a medium priority level such that steps 160 and 164 provide enhanced video where the vehicle is highlighted in orange or some other medium priority color. If vehicle 14 were to come even closer to the host vehicle, then steps 150 and 154 may highlight the corresponding pixels in red or some other color that has been selected to denote a high priority level. The green, orange and red coloring scheme is not the only way in which an in-path object of interest can be highlighted; other techniques may also be used, as mentioned above. In the preceding examples, the remainder of the pixels in the enhanced video (i.e., those pixels that were filtered out or are not assigned a high, medium or low priority level) may be provided in black and white, grey scale, or some other format so that the highlighted pixels are easily distinguishable to the driver.

Those skilled in the art of video and/or image editing, manipulation, processing, etc. will appreciate that there a variety of ways in which the enhanced video can be generated and provided. For instance, steps 154, 164 and/or 174 can overlay the new coloring scheme with the highlighted pixels or groups of pixels (e.g., the pixel vectors associated with the in-path object of interest) overtop of a black and white version of the video originally obtained from vision system 20 so that enhanced video is created. In this case, the in-path object of interest, such as vehicle 14, is highlighted with a particular color that denotes its current urgency or priority and easily stands apart from the rest of the video image which is in black and white. This type of approach may be useful during both day- and night-time driving environments, and may be coupled with audible and/or other warnings to alert the driver of the in-path object. In another embodiment, the method simply removes the background of the video image (i.e., those pixels or groups of pixels not associated with an in-path object of interest) from the video so that all the driver sees is the highlighted in-path object of interest against a blank background. Other techniques are also possible. Steps 110-174 may be performed or carried out by vision system 20, control module 22, some other device, or a combination thereof, and may be performed on an individual pixel-by-pixel basis, pixel group-by-pixel group basis, or according to some other approach.

In step 180, the method provides enhanced video to visual display 24, with one or more in-path objects being highlighted. As mentioned above, visual display 24 may include one of a number of display units such as a color heads-up display (HUD) unit. Depending on the particular setup, visual display 24 may continuously receive and display to the driver enhanced video from control module 22, or it may only display enhanced video when an in-path object of interest has been detected or some other criteria has been met. If multiple in-path objects of interest are detected, the method may determine which object presents a more imminent danger and highlight that object only, or it may highlight multiple objects at the same time according to the priority scheme described above. It is also possible for method 100 to send a command signal of some type to an active safety system, such as a collision avoidance system, etc., in the event that a high, medium and/or low priority level is determined. Coordination between such systems may be carried out via a vehicle communications bus or the like. Other features and embodiments are possible as well.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. In one such example, steps 120 and 130 are switched so that pixels not associated with in-path objects of interest are filtered out before time-to-collision values are determined. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A collision warning system for a vehicle, comprising:
   a vision system being mounted on the vehicle, the vision system provides color video of an upcoming road segment that includes at least one in-path object;
   a control module being coupled to the vision system, the control module receives the color video from the vision system and provides enhanced video of the upcoming road segment that includes the in-path object, wherein the in-path object is highlighted in color according to collision data by graying out a background of the color video so that the in-path object stands apart from the rest of the upcoming road segment which is in black and white; and
   a color heads-up display (HUD) being coupled to the control module, the color heads-up display (HUD) receives the enhanced video from the control module and displays the enhanced video to a driver on a windshield of the vehicle, wherein the enhanced video that is displayed on the color heads-up display (HUD) includes the in-path object in color set against the rest of the upcoming road segment in black and white so as to create a contrast that acts as an intuitive warning to the driver.

2. The collision warning system of claim 1, wherein the vision system is a forward-looking stereo vision system and includes a plurality of video cameras, the vision system provides real-time video of the upcoming road segment.

3. The collision warning system of claim 1, wherein the control module receives both the video and the collision data from the vision system.

4. The collision warning system of claim 1, wherein the control module receives the video from the vision system and the collision data from at least one object-detecting sensor that is separate from the vision system.

5. The collision warning system of claim 4, wherein the object-detecting sensor is an infrared (IR) sensor that is directed at the upcoming road segment and provides time-to-collision data for the in-path object.

6. The collision warning system of claim 1, wherein the control module provides enhanced video of the upcoming road segment that includes the in-path object highlighted with a color that changes according to the collision data so that it becomes more noticeable to the driver as the vehicle gets closer to the in-path object.

7. A method of operating a collision warning system for a vehicle, comprising the steps of:
   (a) receiving color video from a vision system, the color video is of an upcoming road segment and includes a plurality of pixels associated with an in-path object;
   (b) receiving collision data from one or more object detecting sensors, the collision data pertains to the in-path object and is used in conjunction with the color video to determine time-to-collision values for the plurality of pixels associated with the in-path object;
   (c) using the color video and the collision data to generate enhanced video, the enhanced video is of the upcoming road segment and includes the in-path object which is highlighted in color for at least some of the plurality of pixels associated with the in-path object according to the time-to-collision values and the remaining pixels of the upcoming road segment that are not associated with the in-path object are grayed out so as to be in black and white; and
   (d) providing the enhanced video to a visual display and displaying the enhanced video with the in-path object in color set against the remaining pixels in black and white.

8. The method of claim 7, wherein step (a) further comprises continuously receiving video on a real-time basis so that the video streams from the vision system.

9. The method of claim 7, wherein step (a) further comprises intermittently receiving video on an event basis so that the video is provided from the vision system only when the in-path object is detected.

10. The method of claim 7, wherein step (c) further comprises filtering out a plurality of pixels in the video that are not associated with the in-path object.

11. The method of claim 10, wherein step (c) further comprises determining a priority level for the plurality of pixels in the video that are associated with the in-path object, and the priority level is based on the time to-collision values.

12. The method of claim of claim 11, wherein step (c) further comprises selecting between a first priority level with a first range of time-to-collision values, a second priority level with a second range of time-to-collision values, and a third priority level with a third range of time-to-collision values.

13. The method of claim 11, where step (c) further comprises highlighting the plurality of pixels in the video that are associated with the in-path object with a certain color that is selected according to a priority level.

14. The method of claim 13, wherein step (c) further comprises removing the plurality of pixels in the video that are not associated with the in-path object so that they are not displayed in the enhanced video.

15. The method of claim 7, wherein step (d) further comprises providing the enhanced video to a head-up display (HUD) so that the in-path object is highlighted and stands apart from the rest of the upcoming road segment.

16. The method of claim 7, wherein step (d) further comprises providing enhanced video to the visual display that includes multiple in-path objects, where each in-path object is highlighted according to a priority scheme that is based on time-to-collision data.

17. A method of operating a collision warning system for a vehicle, comprising the steps of:
   (a) receiving color video from a vision system, the color video is of an upcoming road segment and includes a plurality of pixels associated with an in-path object;
   (b) receiving collision data from one or more object detecting sensors, the collision data pertains to the in-path object and is used in conjunction with the color video to determine time-to-collision values for the plurality of pixels associated with the in-path object;
   (c) using the color video and the collision data to generate enhanced video, the enhanced video is of the upcoming road segment and includes the in-path object which is highlighted in color for at least some of the plurality of pixels associated with the in-path object according to the time-to-collision values and the remaining pixels of the upcoming road segment that are not associated with the in-path object are removed; and (d) providing the enhanced video to a visual display and displaying the enhanced video with the in-path object in color and the remaining pixels of the upcoming road segment removed.

\* \* \* \* \*